United States Patent [19]

Mefferd

[11] 4,387,845

[45] Jun. 14, 1983

[54] METHOD AND APPARATUS FOR HOLDING AND COOLING A METAL TUBE DURING WELDING

[76] Inventor: Roy J. Mefferd, 219 W. Myrtle St., Laurens, Iowa 50554

[21] Appl. No.: 202,129

[22] Filed: Oct. 30, 1980

[51] Int. Cl.³ ............................................ B23K 31/06
[52] U.S. Cl. ...................................... 228/222; 228/46; 269/48.1; 219/61.7; 219/160
[58] Field of Search ................... 228/46, 496, 50, 199, 228/222; 219/160, 61.7; 285/41, 382.4, 382.5; 269/48.1; 279/2 R, 2 A

[56] References Cited

U.S. PATENT DOCUMENTS

| | | | |
|---|---|---|---|
| 1,348,434 | 8/1920 | Marshick | 279/2 R |
| 1,435,919 | 11/1922 | Fay | 219/160 |
| 1,467,821 | 9/1923 | Tuttle | 279/2 R |
| 1,857,802 | 5/1932 | Baker | 228/50 |
| 2,383,036 | 11/1945 | Benjamin | 279/2 R |
| 2,541,078 | 2/1951 | Lescauette | 279/2 R |
| 3,031,995 | 5/1962 | Taylor, Jr. | 269/48.1 |
| 3,311,383 | 3/1967 | Cox | 279/2 R |
| 3,742,186 | 6/1973 | Finkel et al. | 269/48.1 |
| 3,986,383 | 10/1976 | Petteys | 269/48.1 |

FOREIGN PATENT DOCUMENTS 24276 12/1956 Fed. Rep. of Germany ..... 269/48.1

Primary Examiner—Nicholas P. Godici
Assistant Examiner—M. Jordan
Attorney, Agent, or Firm—Zarley, McKee, Thomte, Voorhees & Sease

[57] ABSTRACT

The apparatus of the present invention is used for holding and cooling a metal tube during welding. The tube has a cylindrical bore of predetermined diameter extending therethrough. The apparatus comprises a cylindrical mandrel having a bore extending axially therethrough. The bore has a central portion of reduced diameter and has outwardly tapering portions at its opposite ends. The mandrel also has a plurality of elongated axially extending slots formed in the walls of the mandrel so as to permit the mandrel to expand radially outwardly. Cam means are positioned within the mandrel bore and are adapted to be moved to cause outward radial expansion of the mandrel. The method of the present invention comprises placing the mandrel within the cylindrical bore of the metal tube, and expanding the mandrel radially outwardly against the inner surface of the metal tube, so as to hold the tube in place and cool it during welding.

7 Claims, 6 Drawing Figures

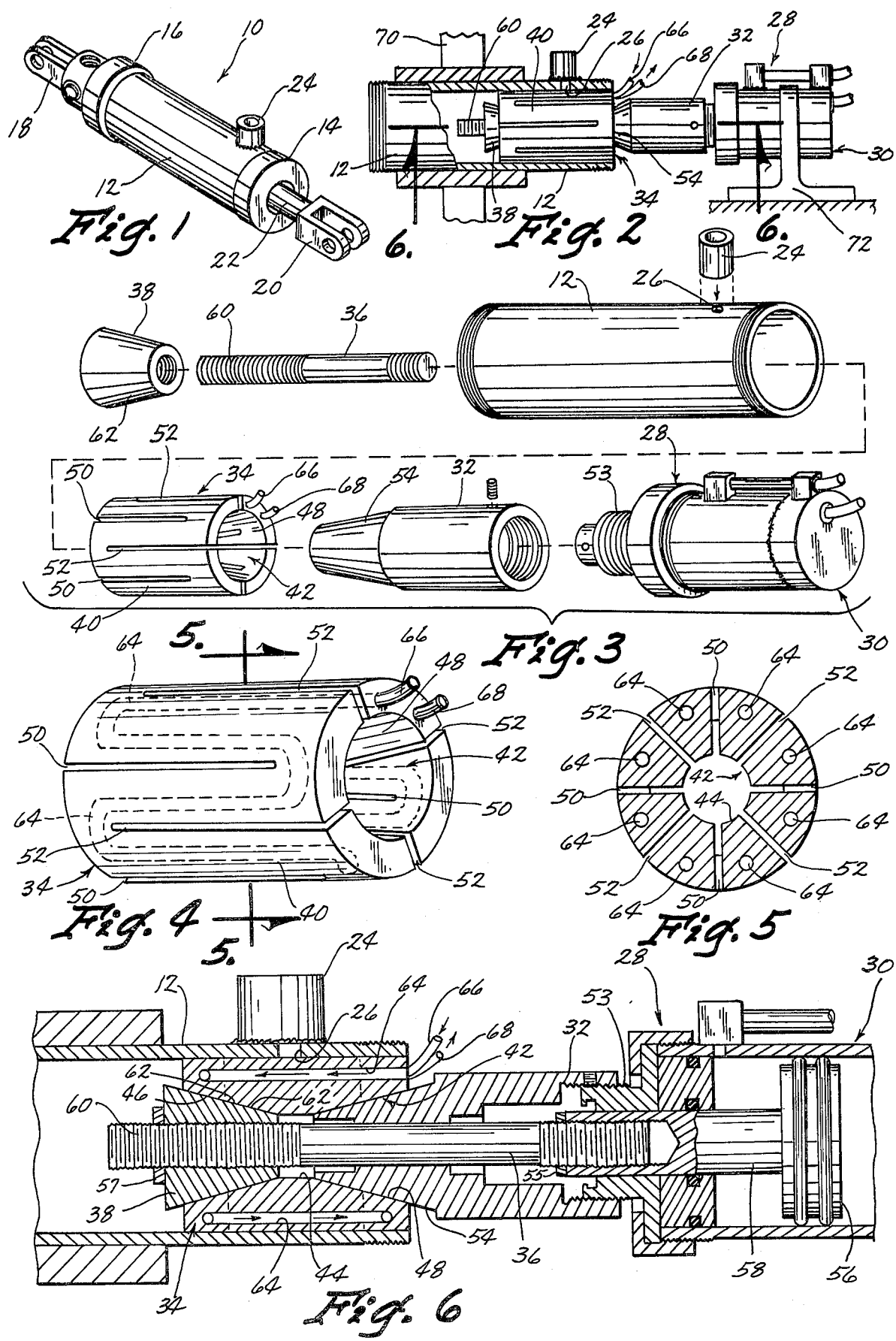

METHOD AND APPARATUS FOR HOLDING AND COOLING A METAL TUBE DURING WELDING

BACKGROUND OF THE INVENTION

This invention relates to an improved method and apparatus for holding and cooling a tube during welding.

Certain problems are encountered while attempting to weld items to a cylindrical metal tube. Because of the heat from the welding, the walls of the tube become warped, thereby causing the tube to have an irregular non-cylindrical shape a considerable distance from the welded portion. This problem is particularly critical in the making of hydraulic cylinders wherein the barrels of the cylinders must be kept round to within very close tolerances.

In present methods for making hydraulic cylinders, the barrel of the cylinder is honed on the inner surface so that the inner cylindrical surface is round to very close tolerances. The couplings for the hydraulic hoses to be used with the cylinders are then welded to the exterior surface of the cylinder barrel. During welding, the barrel becomes warped and loses its round configuration in the vicinity where the welding occurred. It is therefore necessary to rehone the interior of the cylinder after the welding is finished in order to have a cylindrical round surface for receiving the cylinder piston.

Therefore, a primary object of the present invention is the provision of an improved method and apparatus for holding and cooling a metal cylinder during welding.

A further object of the present invention is the provision of a method and apparatus which permits the tube to be maintained in a true, round shape throughout the welding process.

A further object of the present invention is the provision of a method and apparatus which minimizes the tendency of the tube to warp during welding.

A further object of the present invention is the provision of a method and apparatus which eliminates the need to rehone the interior surface of the cylinder after welding.

A further object of the present invention is the provision of a method and apparatus which keeps the barrel cool enough during welding to minimize oxidizing of the metal in the cylinder barrel.

A further object of the present invention is the provision of an apparatus having a mandrel positioned in the interior of the barrel and being expandable in a uniform manner along its entire length, so as to press outwardly against the inner surface of the barrel with a uniform pressure along the entire axial length of the mandrel.

A further object of the present invention is the provision of an apparatus and method which permits the use of cooling fluid to carry heat away from the area where welding occurs.

A further object of the present invention is the provision of a device which is economical to manufacture, durable in use and efficient in operation.

SUMMARY OF THE INVENTION

The present invention utilizes a cylindrical mandrel which can be inserted inside the cylinder which is being welded. The mandrel has cam means within it and has a plurality of elongated slots extending axially through its walls. The cam means are adapted to exert pressure in an outward radial direction on the mandrel, so that the mandrel will expand radially outwardly and tightly grip the interior surface of the tube to be welded.

The elongated slots extend from both ends of the mandrel in alternative fashion so that when the mandrel expands radially outwardly it maintains its cylindrical shape and maintains a constant cross-section throughout its length. The result is an even pressure on the interior surface of the tube so as to maintain the tube in its original cylindrical shape.

The mandrel also has an elongated meandering passageway which extends through its walls and which is adapted to carry pressurized water or coolant so as to remove heat from the area where the welding occurs. Thus, the heat from the welding passes through the metal walls of the tube being welded and into the metal walls of the mandrel. The water or coolant then carries much of this heat away.

It has been found with the present method that the interior surface of the tube being welded shows little or no color after the welding has been completed. This means that the temperature of the interior surface of the tube has been maintained at or below approximately 350° F. because it is at this temperature that the discoloration of the metal normally starts to occur.

The tube being welded thus does not warp and maintains its original round configuration without the necessity of being rehoned after the welding process.

BRIEF DESCRIPTION OF FIGURES OF THE DRAWINGS

FIG. 1 is a perspective view of a hydraulic cylinder in its completed form.

FIG. 2 is a sectional view of the barrel of the hydraulic cylinder having the device of the present invention inserted therein.

FIG. 3 is an exploded perspective view of the various components shown in FIG. 2.

FIG. 4 is a perspective view of the mandrel used with the present invention, showing the water passageway in hidden lines.

FIG. 5 is a sectional view taken along line 5—5 of FIG. 4.

FIG. 6 is a sectional view taken along line 6—6 of FIG. 2.

DETAILED DESCRIPTION OF THE INVENTION

The numeral 10 generally designates a hydraulic cylinder in its completely assembled condition. Cylinder 10 comprises a cylindrical barrel 12 having end caps 14, 16 threaded on the axial ends thereof. A base clevis 18 is at one end of cylinder 10, and a rod clevis 20 is at the other end of cylinder 10, being mounted on the end of the cylinder rod 22.

Welded on the outer cylindrical surface of barrel 12 is a hose coupling 24 which is in communication with the interior of barrel 12 by means of a hole 26 (FIGS. 2 and 3) in the cylindrical walls of barrel 12.

In the construction of cylinder 10, the barrel 12 is manufactured and the interior thereof honed so that the interior cylindrical surface of barrel 12 is as perfectly round as is mechanically possible. The importance of maintaining the barrels in a round condition is that the piston used in the barrel must have a constant close fit as the piston moves from one end of the cylinder barrel 12 to the other. If the barrel is slightly out of round at any point along its length, there is a possibility that leakage of hydraulic fluid will occur around the rings of the piston.

Hose coupling 24 is normally welded to the exterior surface of barrel 12 in covering engagement over opening 26. A problem has been encountered in welding coupling 24 onto the surface of barrel 12 because the welding process causes heating of the barrel 12 itself in the vicinity of the weld joint at the base of coupling 24. This elevated temperature causes warping of the cylinder barrel, thereby disfiguring the barrel in a manner that causes it to lose its round configuration for a considerable distance of its length. It has therefore been necessary to rehone the interior surface of the barrel so that it will be perfectly smooth and will be round along its entire length.

The present invention is designated generally by the numeral 28 and comprises a draw cylinder 30, a tapered mandrel 32, an expanding mandrel 34, a draw rod 36 connected to a piston 56 within draw cylinder 30, and a tapered block 38 threadably mounted on the end of draw rod 36.

Expanding mandrel 34 is shown in FIGS. 4-6 and includes a cylindrical outer surface 40 which is sized normally slightly less than the interior cylindrical surface of barrel 12. This permits mandrel 34 to be slidably inserted within the interior of barrel 12 so that it is positioned in registered alignment radially inwardly from the point of welding around coupling 24. Mandrel 34 has an axial bore 42 extending therethrough. Bore 42 comprises a central reduced straight diameter portion 44 and two outwardly diverging cone shaped tapered portions 46, 48 at its opposite ends.

Extending inwardly from one end of mandrel 34 are a plurality of spaced apart slots 50 and extending inwardly from the opposite end of mandrel 34 are a plurality of elongated slots 52. Slots 50 and 52 overlap, and each terminate a short distance from the end of the mandrel. Slots 50, 52 are also alternatively positioned around the circumference of mandrel 34 as is readily seen in FIG. 5.

Mandrel 34 is preferably comprised of brass, bronze or copper and has sufficient resiliancy to be capable of expanding radially outwardly in response to outward radial pressure on the walls of the mandrel 34. Slots 50, 52 permit this expansion to take place. Furthermore, since slots 50, 52 extend inwardly from opposite ends of the mandrel 34, the expansion of the mandrel is such that the outer cylindrical surface of the mandrel is maintained in a constant diameter along its axial length during the time that this constant diameter is expanding.

The outward radial pressure is provided by means of tapered mandrel 32, and tapered block 38. Tapered mandrel 32 includes a cone shaped tapered surface 54 at one end thereof. This cone shaped surface 54 is adapted to be matingly fitted within the cone shaped tapered portion 48 of mandrel 34. The opposite end of mandrel 32 is threaded upon a threaded coupling 53 at one end of draw cylinder 30. Cylinder 30 has a piston 56 therein and a piston rod 58 which extends slidably through threaded coupling 53 and which has one end of draw rod 36 threadably inserted therein and held by a lock nut 55. Thus, reciprocating movement of piston 56 within draw cylinder 30 causes draw rod 36 to reciprocate in unison therewith. Draw rod 36 extends slidably through tapered mandrel 32 and has threads 60 on its outer end for threadably receiving tapered block 38. Tapered block 38 includes a cone shaped tapered surface 62 which is adapted to matingly fit against tapered portion 46 of bore 42 in mandrel 34. A lock nut 57 holds tapered block 38 in place on rod 36.

Mandrel 34 includes a cooling fluid passageway 64 having an inlet 66 on one end and an outlet 68 on the other end. Passageway 64 extends within the walls of mandrel 34 and meanders around the slots 50, 52 as is shown by FIGS. 4 and 5. When the inlet is connected to a source of water or coolant, the water or coolant is free to circulate in passage 64 and to exit by outlet 68 so as to cool mandrel 34.

In operation, mandrel 34 is inserted on rod 36 with cone-shaped surface 48 in mated relation with cone shaped surface 54 of tapered mandrel 32. Tapered block 38 is then threaded onto thread 60 so as to hold mandrel 34 in position as shown in FIG. 6. Barrel 12 is then slipped over mandrel 34 so that coupling 24 is positioned over mandrel 34.

Piston 56 is then withdrawn so as to move block 38 towards mandrel 32 in the fashion shown in FIG. 6. As can be seen from FIG. 6, cone-shaped tapered surface 62 of block 38 matingly fits within tapered portion 46 of bore 42. Similarly, the tapered surface 54 of mandrel 32 matingly fits within the tapered portion 48 of bore 42. Upon continued withdrawing movement of piston 56, the tapered block 38 and the mandrel 32 cause a camming action on mandrel 34 which causes mandrel 34 to expand radially and tightly engage the interior surface of cylinder 12.

Because the radial expansion of mandrel 34 is substantially uniform along its entire length, it engages the interior surface of cylinder 12 and holds the interior surface of cylinder 12 in a substantially cylindrical configuration. Inlet nozzle 66 is connected to a source of pressurized water or coolant and water or coolant is circulated through passageway 64 in mandrel 34.

Hose coupling 24 is then welded to the outer surface of cylinder barrel 12. The heat from the welding operation passes through the metal cylindrical walls of barrel 12 and continues to be conducted away from this region by the metallic engagement between mandrel 34 and barrel 12. The circulating water or coolant within passageway 64 also facilitates the carrying away of heat very rapidly from the region of welding. Furthermore, the pressure of mandrel 34 against the interior walls of cylinder 12 inhibits the warping action or disfiguration of the cylindrical shape of the barrel 12.

The metal of barrel 12 has been found to begin showing color at approximately 350° F. The showing of color indicates that oxidation has begun taking place within the metal of barrel 12, thereby producing expansion and warping of the barrel. The color becomes darker and darker, and reaches its maximum darkness at approximately 800°-900° F.

However, with the present invention, inspection of the barrel after the welding operation shows that little or no discoloration has occurred on the interior surface of barrel 12. Similarly, the round configuration of barrel 12 has not been disfigured or warped and it is not necessary to rehone the interior surface of barrel 12 after the welding has been completed. This is the result of both the pressure exerted by mandrel 34 on the interior surface of barrel 12 and the temperature conduction function which is provided by mandrel 34. Thus, it can be seen that the device accomplishes at least all of its stated objectives.

What is claimed is:

1. An apparatus for holding and cooling a metal tube having a cylindrical tube bore of predetermined diameter extending therethrough, said apparatus comprising:
   a cylindrical mandrel having an external cylindrical surface of a diameter slightly less than said predetermined diameter of said tube bore so as to permit slidable insertion of said mandrel into said tube bore;
   said mandrel having a mandrel bore extending axially therethrough, said mandrel bore having a central portion of reduced diameter and having tapered portions at its opposite ends, said tapered portions commencing at said central portion and tapering radially outwardly towards the opposite ends of said mandrel;
   said mandrel having a first set of elongated slots formed therein and extending axially inwardly from one of said opposite ends of said mandrel, a second set of elongated slots being formed in said mandrel and extending axially inwardly from the other of said opposite ends, each of said slots having a length slightly less than the axial length of said mandrel,
   cam means for creating a radial outward pressure against said tapered portions of said mandrel bore for spreading said slots and increasing the diameter of said mandrel, said cam means comprising first and second tapered wedges each engaging one of said tapered portions of said mandrel bore, and power means connected to said tapered wedges for forcing them towards said central portion of said mandrel bore; and
   at least one coolant passageway extending internally through the walls of said mandrel, said passageway having an inlet opening and an outlet opening.

2. An apparatus according to claim 1 wherein said slots of said first set are spaced circumferentially from one another and said slots of said second set are positioned in the spaces between said first set.

3. An apparatus according to claim 2 wherein said coolant passageway winds around each of said slots of both said first and second sets without intersecting with any of said slots.

4. An apparatus according to claim 3 wherein said mandrel is comprised of a good heat conducting material which has sufficient resiliency and flexibility to permit said mandrel to expand radially in response to movement of said wedges toward said central portion of said mandrel bore and to permit said mandrel to return to its original diameter in response to movement of said wedges away from said central portion of said mandrel bore.

5. A method for holding and cooling a tube during welding, said tube having cylindrical walls and a cylindrical bore extending axially therethrough, said method comprising:
   inserting a cylindrical mandrel into said bore, said mandrel having longitudinal slots therein to permit yieldable expansion of said mandrel in a radial direction;
   inserting a pair of tapered wedges into the opposite ends of a mandrel bore extending through said mandrel, said mandrel bore having tapered surfaces engaging said tapered wedges;
   forcing said tapered wedges toward one another so as to cam against said tapered portions and cause outward radial expansion of said mandrel against the interior surface of said tube walls,
   welding a metal attachment to the exterior of said tube; and
   cooling said tube during welding thereon by circulating a cooling fluid through a passageway which extends internally through the walls of said mandrel.

6. A method according to claim 5 comprising expanding said mandrel uniformly along its axial length whereby said mandrel maintains a substantially cylindrical shape throughout said expansion.

7. An apparatus for holding and cooling a metal tube having a cylindrical tube bore of predetermined diameter extending therethrough, said apparatus comprising:
   a cylindrical mandrel having an external cylindrical surface of a diameter slightly less than said predetermined diameter of said tube bore so as to permit slidable insertion of said mandrel into said tube bore;
   said mandrel having a mandrel bore extending axially therethrough, said mandrel bore having a central portion of reduced diameter and having tapered portions at its opposite ends, said tapered portions commencing at said central portion and tapering radially outwardly towards the opposite ends of said mandrel;
   said mandrel having cylindrical walls comprised of a plurality of wall segments which are yieldably expandable away from one another so as to permit outward radial expansion of said external cylindrical surface of said mandrel;
   cam means for creating a radial outward pressure against said tapered portion of said mandrel for causing outward radial expansion of said wall segments, said cam means comprising first and second tapered wedges each engaging one of said tapered portions of said mandrel bore;
   at least one coolant passageway extending internally through the walls of said mandrel, said passageway having an inlet opening and an outlet opening, and
   power means connected to said tapered wedges for forcing them towards said central portion of said mandrel bore.

* * * * *